US010230141B2

(12) United States Patent
Uhlenbruck et al.

(10) Patent No.: US 10,230,141 B2
(45) Date of Patent: Mar. 12, 2019

(54) ELECTROCHEMICAL ENERGY STORE AND METHOD FOR OPERATING THE SAME

(71) Applicant: Forschungszentrum Juelich GmbH, Juelich (DE)

(72) Inventors: Sven Uhlenbruck, Pulheim (DE); Martin Finsterbusch, Juelich (DE); Eva Maria Hammer, Richmond (GB); Hans Peter Buchkremer, Heinsberg (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 22 days.

(21) Appl. No.: 15/121,724

(22) PCT Filed: Feb. 3, 2015

(86) PCT No.: PCT/DE2015/000040
§ 371 (c)(1),
(2) Date: Aug. 25, 2016

(87) PCT Pub. No.: WO2015/127915
PCT Pub. Date: Sep. 3, 2015

(65) Prior Publication Data
US 2016/0365614 A1 Dec. 15, 2016

(30) Foreign Application Priority Data
Feb. 25, 2014 (DE) .................... 10 2014 002 451

(51) Int. Cl.
*H01M 12/08* (2006.01)
*H01M 4/36* (2006.01)
(Continued)

(52) U.S. Cl.
CPC ........... *H01M 12/08* (2013.01); *H01M 4/368* (2013.01); *H01M 8/1009* (2013.01);
(Continued)

(58) Field of Classification Search
CPC ...... H01M 10/36; H01M 10/38; H01M 12/08; H01M 4/368; H01M 8/1009
See application file for complete search history.

(56) References Cited

U.S. PATENT DOCUMENTS

2003/0021900 A1* 1/2003 Jacobson ............. B01D 53/326
427/376.2
2011/0033769 A1 2/2011 Huang et al.
(Continued)

FOREIGN PATENT DOCUMENTS

DE 3026141 A1 2/1982
WO 96/23322 A1 8/1996
(Continued)

OTHER PUBLICATIONS

Harry Abernathy, et al.: "Basic properties of a liquid tin anode solid oxide fuel cell", Journal of Power Sources, Elsevier SA, CH, vol. 196, No. 10, Dec. 17, 2010 (Dec. 17, 2010), pp. 4564-4572, XP0281085629.
(Continued)

*Primary Examiner* — Carlos Barcena
(74) *Attorney, Agent, or Firm* — Norris McLaughlin, P.A.

(57) ABSTRACT

A rechargeable energy storage device according to the invention is based on a metal-air battery, in which a gas electrode is used and an ion-conducting or proton-conducting membrane is used as the electrolyte. In contrast to the known metal-air batteries, the active component on the side of the electrolyte membrane opposite the gas electrode is present in the form of a liquid medium in the energy storage device according to the invention. The liquid-medium/gas battery according to the invention comprises a receptacle, which includes a medium in liquid form as the active material at the operating temperature of the battery.

14 Claims, 6 Drawing Sheets

(51) Int. Cl.
*H01M 10/38* (2006.01)
*H01M 8/1009* (2016.01)
*H01M 10/36* (2010.01)

(52) U.S. Cl.
CPC ........... *H01M 10/36* (2013.01); *H01M 10/38* (2013.01); *Y02E 60/128* (2013.01)

(56) References Cited

U.S. PATENT DOCUMENTS

| | | | |
|---|---|---|---|
| 2012/0129058 A1 | 5/2012 | Litzinger et al. | |
| 2012/0328972 A1 | 12/2012 | Lu et al. | |
| 2013/0157149 A1* | 6/2013 | Peled | H01M 4/38 429/405 |
| 2014/0080013 A1* | 3/2014 | Lu | H01M 4/9016 429/405 |

FOREIGN PATENT DOCUMENTS

| | | |
|---|---|---|
| WO | 2004/077596 A1 | 9/2004 |
| WO | 2013/093044 A1 | 6/2013 |

OTHER PUBLICATIONS

Han S K, et al.: Thermodynamic investigation of antimony + oxygen and bismuth + oxygen using solidstate electrochemical techniques, Journal of Chemical Thermodynamics, Academic Press, London, GB, vol. 11, No. 7, Jul. 1, 1979 (Jul. 1, 1979), pp. 627-637, XP023945241.

Jang-Soo Lee, et al.: "Metal-Air Batteries with High Energy Density: Li-Air versus Zn-Air", Advanced Energy Materials, 2011, 1, pp. 34-50.

Charles E. Mortimer, et al.: "3. neubearbeitete Auflage 206 zweifarbige Abbildungen, 102 Tabellen", Chemistry, A Conceptual Approach, 1971 Litton Educational Publishing, Inc., pp. 288-289.

Ernest M. Levin, et al.: "Phase Diagrams for Ceramists", The American Ceramic Society, Inc., 1956, pp. 38, 39, 56 and 57.

"Thermodynamic investigation of antimony + oxygen and bismuth + oxygen using solid state electrochemical techniques", S. K. Hahn et al., J. Chem. Thermodynamics, vol. 11, pp. 627-637.

* cited by examiner

ELECTROCHEMICAL ENERGY STORE AND METHOD FOR OPERATING THE SAME

BACKGROUND OF THE INVENTION

The invention relates to an energy storage device, and in particular to an electrochemical energy storage device that can be charged multiple times. The invention further relates to a method for operating the aforementioned energy storage device.

So as to be able to store larger amounts of electric energy cost-effectively, for example for the stationary intermediate storage of power, reversibly-operating electrochemical storage devices having suitable energy densities, which can be scaled to large sizes and are preferably easy to produce are required. An electric battery shall be understood to mean an interconnection of multiple identical galvanic cells or elements. Strictly speaking, the term "battery" refers only to non-rechargeable so-called "primary cells" or "primary elements." In contrast, "accumulators" is the term for rechargeable "secondary cells" or else "secondary elements." However, use of the term "battery" has become somewhat lax of late, so that within the scope of the present invention the term "battery" is also used hereafter for rechargeable energy storage devices in a more generalized manner.

In principle, different battery types exist for different requirements, which differ in various respects ranging from the voltage curve to durability, and should be used accordingly.

The different battery types generally employ different storage materials (active materials), which may be present in at least one reduced form and one oxidized form (redox pair). With the aid of this active material, excess electric energy (such as from wind or solar energy) can be used to reduce the oxidized form of the active material, for example a metal oxide. The storage device is charged in the process. The reduced active material, such as a metal, can then be re-oxidized again as needed, thereby releasing electric energy. The storage device is discharged.

The active material used (redox pair) determines the rated voltage of the cell, while the amount of active material influences the energy content of the cell.

In addition to the generally known and customary types, such as zinc-carbon batteries, alkali-manganese batteries, or rechargeable lead, NiCd, NiMH or Li-ion batteries, a variety of designs of batteries have also become known as energy storages devices, which will be briefly outlined hereafter.

One design involves the redox flow batteries, as shown schematically in FIG. 1. In these, the electric energy is stored in chemical compounds (active material), which at room temperature are each present in dissolved form in a solvent. For this purpose, the electrolytes comprising the active material each respectively circulate in one of two circuits separated by a membrane. The ion exchange takes place via the membrane. The cell voltage in these systems is normally between 1.0 and 2.2 V. The solvents used are either inorganic or organic acids. Compounds made of titanium, iron, chromium, vanadium, cerium, zinc, bromine and sulfur are known active materials (redox pair).

Since the electrolytes comprising the energy-storing compounds can be stored outside the cell in separate tanks, this battery type is one example of electrochemical energy storage devices which have the advantage of allowing for varying and scaling the amount of energy by way of the electrolyte volume, and varying and scaling the power by way of the size of the electrode surface, independently of one another. A further advantage is that practically no self-discharge takes place when the system is idle.

Compared to other storage technologies, the redox flow battery has a high efficiency, allows self-discharge to be reliably avoided, and has a long life span since, among other things, the electrode material, which is usually graphite, is not directly involved in the electrochemical reaction of the electrolyte, and thus does not degenerate. However, the energy densities achieved thus far with redox flow batteries are still comparatively low.

Furthermore, various additional apparatus-related devices, such as pumps and the like, are needed for managing operations, which must be suitable for use of the electrolytes that are generally corrosive. Furthermore, large volume flows must be moved or controlled given the typically low solubility of the active materials in the solvent, which is usually water.

Another battery type is the high-temperature liquid metal battery. A well-known example of this is the sodium-sulfur system, for example. For the reactants, this form of battery usually employs two liquid materials serving as the electrodes, separated by a solid electrolyte. The operating temperature typically ranges around 700° C.

The high temperatures are necessary to bring the electrodes into a liquid state and render the ceramic electrolyte conductive. The electrodes can only be involved in the charging and discharging reactions in the liquid state. Such batteries can be used, for example, as stationary energy storage devices in wind and solar power plants.

Breakage of the electrolyte constitutes a critical incident in terms of safety in this type of battery, and may subsequently result in an uncontrolled reaction between the reactants, and thus in an uncontrolled release of energy.

In addition to these, a further liquid metal accumulator from the USA is known, in which the anode is made of magnesium, the electrolyte is made of the molten salt electrolyte $MgCl_2$—KCl—NaCl, and the cathode is made of antimony (Sb). The operating principle is apparent from FIG. 2.

The composition and mode of operation of the aforementioned liquid metal accumulator are as follows: During heating to approximately 700° C., the materials, which are a mixture of ground magnesium and antimony metals, melt together with the $MgCl_2$—KCl—NaCl salt mixture and, by virtue of the differing specific densities, form three horizontal layers.

The uppermost layer comprises the pure magnesium and serves as the negative electrode. The bottom layer is composed of a magnesium-antimony alloy, which forms the positive electrode of the accumulator. A salt layer composed of magnesium, potassium, sodium and chlorine forms the intermediate layer, constituting the electrolyte.

During the charging process, electrons find their way into the top magnesium electrode layer. At the same time, positively charged Mg ions form, releasing electrons from the magnesium-antimony alloy of the bottom electrode layer, and migrate through the electrolyte, likewise to the top magnesium layer, where they form metallic magnesium, accepting an electron. Conversely, during discharge, electrons are tapped in the top electrode, and Mg ions, which are again positively charged, migrate from the top magnesium electrode layer through the electrolyte back into the bottom layer.

Such an accumulator cell is suited for current densities of up to 200 $mA/cm^2$. In general, the voltages of this battery type are considerably less than 1 V.

Another interesting alternative is metal-air batteries. Metal-air batteries are essentially batteries in which either (i) air is transported by an appropriate ion conductor and reacted there with a solid material (active material), or (ii) the solid material (active material) is first ionized and transferred into the electrolyte, then transported from there to the counter electrode, and oxidized there in an oxygen-containing medium.

Examples of the embodiment cited in (i) are described in the patent applications US 2012/0328972, US 2011/0033769 A1, WO 96/23322 and WO 2013/093 044 A1, for example.

In some lithium batteries, metallic lithium serves as the anode. In essence, this participates completely in the electrochemical reaction. One problem is posed by the growth of lithium metal during charging: it does not grow as a planar layer, but in the manner of a directed network, known as dendrite growth. These needle-like structures can cause undesirable short circuits in a battery cell.

One well-known example of lithium-metal-containing batteries is the rechargeable lithium-air battery, for example. More recent research is also directed to replacing lithium with sodium or zinc.

One problem with the metal-air batteries according to (i) is that of suitably bringing oxygen ions to the metal serving as the active material, while preventing damage to the battery from increases in the volume of the metal during oxidation, and preventing phases from forming that are not electrically conducting and considerably slow the further desired reaction.

FIGS. 3a to 3d (using the same schematic style as FIG. 5) show that there are four different variations for Li-air batteries alone, in terms of the design of the electrolyte: non-aqueous electrolytes, aqueous electrolytes, hybrid electrolytes, and solid electrolytes. All designs have in common that solid lithium metal is used as the anode material, and oxygen is used as the oxidizing agent at the cathode, as is apparent from FIGS. 3a to 3d. LiSICON denotes a Li super-ionic conductor.

The problem that can arise with the metal-air batteries according to (ii) is that all of the active material, which generally is metal, must first be ionized, and subsequently all of this material must be moved through the electrolyte. In place of the active material, an empty space is thus created in the remaining metal lattice, which must be appropriately filled again during charging. Moreover, problems with the electrical contact between the material and the current tap and between the material and the electrolyte may arise at this location. While metal that is again deposited during charging may grow in the intended location, it cannot be excluded that this may grow in another form, such as in the form of dendrites, instead of in the form of a compact layer. Moreover, the phase that forms at the counter electrode must not be overly thermodynamically stable, since such a phase frequently no longer has reversible properties, which is a disadvantage in the reverse reaction. In the case of a lithium-air system, for example, lithium peroxide would be a suitable phase, while in contrast $Li_2O$ is one example of a very stable phase.

Rechargeable lithium-ion batteries have had widespread success in recent years. They can already be found in many mobile devices. In addition to hybrid and electric vehicles, their field of application also includes the potential storage of power from wind or solar energy plants. Still, these batteries are not yet able to satisfy several requirements, specifically when it comes to energy storage density, and therefore many efforts are underway to explore alternative storage materials. The organic electrolytes used at present are not chemically or thermally stable and frequently also react fiercely with water or oxygen.

In the context of batteries or accumulators, capacity is generally understood to mean the maximum charge these are able to store. This is frequently stated as the product of electric current and time (such as in Ah). Energy within the scope of the invention shall be understood to mean the product of voltage (unit: volt) and charge (unit: ampere hours, for example), wherein this additionally may also be expressed in the form of energy density relative to the mass or the volume of the battery. For this reason, watt hours per kilogram (when based on mass) or watt hours per cubic meters (when based on the volume) is the unit used for energy density.

SUMMARY OF THE INVENTION

The object of the invention is to provide a rechargeable energy storage device, hereafter referred to as a battery, which is able to cost-effectively store larger amounts of electric energy, has sufficient capacity or energy, can be scaled to larger sizes, and is preferably easy to produce and handle.

Moreover, it should withstand a large number of charging and discharging cycles without damage and have a long lifespan.

The rechargeable energy storage device according to the invention is based on a metal-air battery, in which a gas electrode is used, and an ion-conducting or proton-conducting membrane is used as the electrolyte, similarly to that which is shown in FIG. 3d as the state of the art. The function of the gas electrode is to react with gas molecules from the gas compartment such that ions (or, in one embodiment, protons) are created from the gas, which are then conducted through the electrolyte. The gas electrode must be electrically conductive due to the need for charge flow during the reaction. The circumstances are similar during the reverse reaction in the case of a reversibly operating battery: The ions (or protons) from the electrolyte are converted at the gas electrode into neutral gas particles in an electrochemical process, accepting or releasing an electric charge, and the gas particles are released into the gas compartment. The gas electrode is generally not chemically converted.

In contrast to the known metal-air batteries, the active component on the side of the electrolyte membrane located opposite the gas electrode is present in the form of a liquid medium in the energy storage device according to the invention. In essence, there are two embodiments:

(i) The liquid active material is in direct contact with the solid electrolyte. In this case, the active material not only stores the charged particles from the electrolyte, but also carries out the electrochemical partial reaction with the necessary charge flow.

(ii) The liquid active material is in contact with the electrolyte by way of a solid catalyst layer on the same. In the extreme case, this catalyst layer not only accelerates the partial reaction, but carries out the entire electrode partial reaction with the associated charge acceptance or release, similarly to what has been described above with respect to the gas electrode, and the liquid active material accepts the partial reaction product (from the particles from the electrolyte). The active material does not necessarily have to be electrically conducting in this case.

In the first case, the liquid active material is referred to hereafter as the counter electrode, and in the second case this is the combination of the catalyst layer (always solid) and the liquid active material.

This liquid active component can participate completely in the electrochemical reaction. The active material can be present at least in one reduced form and one oxidized form (redox pair). In principle, a distinction between two modes of operation must be made.

(i) The gas, or the components or ions thereof, present at the gas electrode, has an oxidizing effect (such as in the case of oxygen): During charging of the energy storage device, at least a portion of the liquid active material present in a reduced form (such as a metal) is converted into an oxidized form (such as a metal oxide), which may likewise be present in the liquid state. At the same time, the oxidizing agent required for the reaction (such as air) is withdrawn from the gas compartment at the gas electrode.

(ii) The gas, or components or ions thereof, present at the gas electrode, has a reducing effect: During charging of the energy storage device, the liquid active material present in oxidized form is converted into a reduced form, which may likewise be present in the liquid state, while the reducing agent required for the reaction is withdrawn from the gas compartment at the gas electrode.

Hereafter, the reversible energy storage device according to the invention is also referred to as a liquid-medium/gas battery.

FIG. 4 shows one embodiment of the liquid-medium/gas battery according to the invention, in which the gas used is air, and in particular oxygen.

The major advantage of the liquid-medium/gas battery according to the invention is that the liquid active material can reorganize or restructure during every charging or discharging cycle, which is to say during every reduction or oxidation, due to the liquid form thereof. The differing specific densities of active material present in reduced form and oxidized form advantageously result in layering within the housing.

Conventional harmful increases in the volume of a solid electrode material during oxidation, and the formation of phases that are not electrically conducting and may considerably slow down the further, desired redox reaction, can thus advantageously be avoided.

The design according to the invention of the liquid-medium/gas battery comprises a receptacle, which contains a medium in liquid form as the active material at the operating temperature of the battery. Suitable materials include: metals, metalloids, oxygen-containing compounds, including simple or complex oxides, nitrogen-containing compounds (including nitrates, nitrides), carbon-containing compounds (including carbides, carbonates), hydrogen-containing compounds (including hydrides), phosphorus-containing compounds (including phosphides, phosphates), halogen-containing compounds (halogens being defined as elements in Group 7 of the periodic table of the elements), chalcogen-containing compounds (chalcogens being defined as elements in Group 6 of the periodic table of the elements), including sulfides, sulfates, silicon-containing compounds, including silicates, germanium-containing compounds or boron compounds, in particular comprising one or more metals or metalloids (based on the entire list ranging from oxides to boron compounds), or mixtures thereof, provided these are present in liquid form at operating temperatures.

Depending on the active material and electrolyte used, typical operating temperatures for the liquid-medium/gas battery according to the invention range between 500 and 1000° C., for example. However, if the active material is already present in the liquid state at lower temperatures (at least one of the phases of the redox pair), it is also possible to select a lower operating temperature.

Heating the liquid-medium/gas battery to the required operating temperature can take place in a conventional manner, which is to say by way of an external means, such as a heater or another heat source.

The active material advantageously comprises a metal or a mixture of metals (including alloys), and furthermore additional substances that lower the melting point of the reaction product, which is to say of the active material present in oxidized form, for example by forming eutectics. Analogously, it is likewise possible to add other substances that lower the softening point when glasses are used as the active material.

During operation of the liquid-medium/gas battery according to the invention, the active material should normally be liquid prior to reacting with the ions from the electrolyte. This active material must be able to (electro-) chemically react with the ions or protons coming from the electrolyte. A high mobility of electrons and/or ions in the liquid active material, or a high conductivity for electrons and ions, is advantageous for the operation of the battery. This advantageously minimizes the internal resistance of the battery.

Furthermore, preferably low adhesion, or a preferably large wetting angle, between the membrane and the liquid phases of the active material is advantageous, since these should preferably detach easily from the membrane during operation and move away in spatial terms.

In essence, the energy storage device can be designed as a closed receptacle, apart from ancillary devices, some of which are necessary, such as a pressure or volume equalization device on the gas and/or counter electrode side, or current feed-throughs.

The receptacle is generally filled completely with active material. Completely within the scope of the present invention shall mean that possible volume changes caused by the oxidation or reduction of the active material are completely taken into consideration. At the maximum anode material volume, no pressure should be generated in the receptacle. Accordingly, cavities develop when the anode material having a higher volume transitions to a lower volume.

The receptacle of the liquid-medium/gas battery is made of a material that is not subject to corrosive attacks on a sustained basis from the liquid active material or corresponding reaction products, which may likewise be liquid. Moreover, this is also stable at the required operating temperatures of the liquid-medium/gas battery, which is to say up to approximately 1000° C. A suitable receptacle material is zirconium oxide, for example.

Moreover, the receptacle additionally comprises an ion-conducting or proton-conducting membrane as the electrolyte, for example a solid ion conductor.

This membrane must likewise be made of a material that is not subject to corrosive attacks on a sustained basis from the liquid active material or corresponding oxidized reaction products, which may likewise be liquid, and from the gas used in the gas compartment. This must also be designed to be stable over a sufficiently long term at the required operating temperatures.

A polymer, glass or solid may be mentioned as a suitable material for this membrane. The term solid here describes a material having a long-range order in the crystal lattice, which is to say that, in an X-ray diffractogram, reflexes due to interferences in the diffraction of the X rays are visible at the lattice planes of the crystal lattice.

The term glass here, generally speaking, is understood to mean a material that is only amorphous, or at most has a short-range order in the crystal lattice, which is to say that, in an X-ray diffractogram, no reflexes due to interferences during the diffraction of the X rays are visible at the lattice planes of the crystal lattice. The viscosities are typically above the order of magnitude of $10^{10}$ Pa*s. In particular, a ceramic (polycrystalline) or a single crystal, or a combination of at least two of the three material classes of polymer, glass or a solid, can be used. Partly crystallized ceramics, known as glass ceramics, are likewise covered as suitable materials for the electrolyte.

In an advantageous embodiment, the electrolyte is an oxygen ion conductor. For example, the electrolyte can comprise a partially substituted $ZrO_{2-\delta}$, substituted with yttrium (Y) or scandium (Sc), for example, having substitution fractions between 0 and 16 mol %. An electrolyte made of $CeO_{2-\delta}$ is also advantageous, wherein between 0 and approximately 30 mol % at the Ce site can optionally be partially substituted with gadolinium (Gd), samarium (Sm), neodymium (Nd) or further rare earths, or with elements of Group 2 of the periodic table, such as strontium (Sr).

However, the electrolyte can also advantageously be designed as a lanthanum-tungstate-based proton conductor, optionally partially substituted with further rare earths at the La site.

The corrosion-resistant wall material and the material of the ion-conducting or proton-conducting membrane can optionally also be identical.

The gas-tight membrane can be present in the form of a thin electrolyte layer and thus has the advantage of high ion conduction, resulting in a lower internal resistance of the liquid-gas battery. Thin layers within this context shall be understood to mean layers having a layer thickness of less than 500 micrometers, and in particular of less than 10 micrometers.

The ion-conducting or proton-conducting membrane can be joined into the receptacle using a joining or sealing material, or by way of a labyrinth seal, or else may only be pressed thereon. As an alternative, the receptacle can also be made completely of one and the same material (ion-conducting or proton-conducting material), and then essentially does not require an additional seal.

Advantageously, a layer is applied to the ion-conducting or proton-conducting membrane serving as the electrolyte on the side facing the active material, the layer being used to improve interfacial reactions (catalysis/catalytic activity), in particular between the liquid active material and ions or protons transported there. This layer is hereafter referred to as the active material-catalyst layer.

A gas electrode is disposed on the other side of the ion-conducting or proton-conducting membrane serving as the electrolyte, and adjoining the same on the side facing away from the membrane is a gas compartment, which can also be essentially closed, apart from ancillary devices, some of which are necessary, such as a gas supply and gas removal option and necessary feed-throughs (see FIG. 4). The gas electrode or the gas compartment can be supplied or operated with either an oxidizing gas or a reducing gas.

The gas electrode can advantageously be applied to the membrane as a layer that converts the gas from the gas compartment, or components thereof, provided for the electrochemical reaction into ions. This layer, which converts the gas or components thereof into ions, may be sealed or porous. This layer is electrically conductive.

Particularly advantageously, air can be used as the oxygen carrier, serving as the gas for the gas electrode of the energy storage device according to the invention. Further suitable gases are gases that generally comprise oxygen, nitrogen, water, hydrogen, carbon dioxide, carbon monoxide or halogens (elements in Group 7 of the periodic table of the elements), or mixtures of these substances, which are used either as the oxidizing agent or as the reducing agent.

In one advantageous embodiment of the invention, a gas-permeable carrier, which ensures the mechanical stability, is additionally disposed adjacent to the gas electrode layer. The carrier can be made of the same material as the gas electrode.

The basic principle of the battery according to the invention is based on the differing chemical potentials between the liquid active material in the reduced form thereof and the oxidized form thereof made with a gas or a portion thereof. One example of differing chemical potentials between the reduced active material and the oxidized active material made with a gas is copper (Cu) as an active material present in the reduced form, and copper oxide ($Cu^{2+}O^{2-}$) as an active material present in oxidized form made with oxygen:

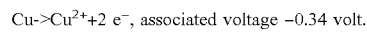

$$Cu \rightarrow Cu^{2+} + 2\ e^-,\ \text{associated voltage } -0.34\ \text{volt.} \qquad [1]$$

The entire reaction in the battery during discharging takes place as follows.

It is a prerequisite that the gas present at the gas electrode and the liquid active material have a different chemical potential than the reaction product. For example, oxygen in a metal-air battery is at least partially chemically reacted at the catalytically-acting gas electrode such that charged particles are created, and these, due to the driving force resulting from the chemical potential gradient, diffuse through the ion-conducting membrane to the liquid medium, which here specifically is the metal. There, they react with the liquid metal and form a second phase, a metal oxide, as a reaction product, which may likewise be liquid.

If the reaction at the interface between the liquid active material and the electrolyte/membrane takes place more slowly than desired, an additional catalyst layer may optionally be applied between the active material and the ion-conducting or proton-conducting membrane. In the case that the catalyst acts not only chemically, but the catalyst, at least some of the time, moreover also assumes the function of an electrode (which is to say accepts or releases electrons), the catalyst should also be designed to be electron-conducting. In this case, advantageously a current tap for the later transport of current through an external circuit is provided directly on the catalyst layer.

The electric charge for the required charge exchange in the gas compartment at the gas electrode flows across the gas electrode and a current tap thereon, or across an electrical conductor, which is in electrical contact with the liquid medium. The gas electrode must have an appropriate electrically conducting design. Gas electrodes from high-temperature fuel cells, which are designed similarly to those in the present invention, have material conductivities in the range of more than 100 siemens per cm or, in other words, a maximum of 0.01 ohm·cm of electrical resistance.

Liquid metals are generally very good electrical conductors, and salt melts, due to the movement of ions, also often have a sufficiently good electrical conductivity to ensure current conduction through the same. Maximally tolerable resistivities, in order to minimize ohmic losses, are highly dependent on the actual design of the receptacle. Assuming, in the simplest case, that a cube serves as the active material, and allowing a maximum of 1% voltage loss compared to the rated voltage, the maximum resistivity will be on an order of magnitude of $10^{-3}$ ohm·cm.

In the case of liquid active materials that have sufficient electrical conductivity, even in the solid state, in a particularly simple embodiment of the invention, a conduit that is filled with the same liquid active material as the receptacle is suitable for current conduction. The conduit comprising the liquid active material is routed to the outside and brought to a temperature that is considerably lower than the melting point of the liquid medium, and thus also below the operating temperature. In this way, an energy consumer can be contacted with a solid electrical conductor. This advantageously allows the occurrence of corrosion at the current tap, and in particular at the interface between the current tap and the liquid medium, to be minimized.

The current conduction can alternatively or additionally also take place via the electrochemically-acting catalyst layer disposed adjacent to the ion-conducting membrane. In this embodiment, it is also possible to use the catalyst material as the material for the current tap so as to minimize undesirable reactions.

One special characteristic of the energy storage device according to the invention is that this type of battery has a preferred orientation during operation due to the design and the properties of the liquid active material. In this respect, special embodiments of the energy storage device, as they are described hereafter, have special advantages.

For example, if it is defined that the electrolyte and the negative gas electrode are arranged within the housing in the y-z plane, in one advantageous embodiment of the invention (see FIG. 4); this means that the electrolyte is then disposed perpendicularly to the surface of the earth in the energy storage device according to the invention. In contrast, the liquid active material in the reduced and oxidized forms normally forms horizontal layers due to gravity, so that, starting with the lowest possible point (which is to say that closest to the earth), this preferably extends in the x-y plane.

Without limiting the generality of the present invention, the special case in which oxygen is used as the oxidizing agent and metal as the liquid active material present in reduced form, as shown in FIGS. 5a, 5b, is used to explain the significance of the advantageous design of the energy storage device and the spatial position of the battery achievable thereby, and to provide a better understanding. Due to gravity, the liquid active material normally forms layers in the x-y plane, wherein the density of the metal present in reduced form is generally higher than that of the oxidized active material, which in the present case is a metal oxide. The liquid metal will thus generally accumulate at the bottom of the housing.

During a discharge cycle, such an advantageous arrangement of the energy storage device according to the invention advantageously causes the negative particles migrating through the membrane to at least always be in direct contact with the active material present in the liquid state, regardless of how far the discharging process has already progressed. During the discharging process, the volume of active material present in reduced form decreases (indicated by a small arrow in FIG. 5a), and thus the contact surface between this phase and the membrane also decreases. Nonetheless, the oxidation of the active material can take place directly at any point in time and is not disadvantageously inhibited by a layer of active material that is already present in oxidized form.

On the other hand, during the charge cycle, this arrangement according to the invention, however, also advantageously causes the particles released during the reaction of the active material to at least always be in direct contact with the electrolyte, regardless of how far the charging process has already progressed. During the charging process, the volume of anode material present in oxidized form decreases (indicated by a small arrow in FIG. 5b), and thus the contact surface between this phase and the membrane also decreases.

Changing the housing in the three-dimensional space (see FIGS. 6 to 8), such as by rotation, can advantageously support the process of discharging, in that the battery is rotated in the x-z plane, and more particularly such that the contact surface between the electrolyte (membrane) and the active material present in reduced form is maximized. In the extreme case, the battery can be rotated 90° in the x-z plane, which means that the gas electrode and the electrolyte are essentially located on the bottom, and the layer made of liquid active material is located directly thereabove. The lighter oxidized active material formed during the charging process advantageously rises directly to the top after being formed, and forms a second layer on the active material present in reduced form. During the entire discharging process, only active material present in reduced form is thus advantageously present at the entire interface with the membrane. Where necessary, care must be taken in this embodiment that the current collector at the anode is disposed close to the electrolyte.

On the other hand, a change in the arrangement of the housing in three-dimensional space can advantageously also support the process of charging in that the battery is rotated in the x-z plane such that the contact surface between the electrolyte (membrane) and the active material present in oxidized form is now maximized. In this embodiment, it would be advantageous if the current collector were disposed somewhat distant from the electrolyte in the liquid phase.

So as to optimally take full advantage of the change in position of the battery both for the charging process and for the discharging process, a variable or accordingly large-surface-area current collection could be provided for the counter electrode, in one special embodiment of the battery.

For cases in which a reducing gas, such as hydrogen, is used instead of an oxidizing agent, the aforementioned chemical reactions at the gas electrode and the counter electrode during the charging and discharging processes take place with a reversed sign for the current flow.

For safety reasons, the liquid-medium/gas battery according to the invention can be operated in a housing that is filled with an inert gas (protective gas) or in an evacuated housing (vacuum). Inert shall mean here that neither the liquid active material nor the gas from the gas compartment (for the reaction) react with the protective gas. If leakages occur, the supply of gas required for the chemical reaction is interrupted, and additionally, due to the inert gas or vacuum, no reactants are available for the liquid active material or for the gas provided for the reaction.

In summary, the advantages of the liquid-medium/gas battery according to the invention as a reversible energy storage device can be given as follows:

The composition comprises few, relatively simple components that can also be produced in larger sizes.

A large number of potentially suitable materials are available for the combination of the membrane and the liquid active material so as to satisfy all the requirements with regard to conductivity, melting point or softening point, density, viscosity, and corrosion properties. Depending on the membrane and the liquid active material, the battery is operated at the normal ambient temperature or at higher temperatures of up to several hundred degrees Celsius.

As a result of the composition of the battery, the electrolyte is in contact with both the oxidized form and the reduced form of the active material at any point in time.

The special composition of the battery furthermore allows the change in position of the battery to advantageously support the charging and discharging processes.

The components of the battery can essentially be easily separated from each other again. The battery is thus advantageously suited for recycling.

Apart from the occurrence of corrosion at the walls, the energy content of the battery can only decrease as a result of leakage, which is to say a loss of material with respect to the liquid active material. The full initial energy content is available again when the receptacle is filled. The circumstances are similar on the gas side.

Except for the potential occurrence of corrosion, only losses of gas due to leakage can lower the energy content. The invention expressly includes air and oxygen as gases. In this case, losses of gas, to the extent they are directed to the outside and not to the liquid active material, are generally insignificant, so that no capacity losses come into play here.

Since the phases of the active material are present in liquid form in the operating state, mechanical stresses resulting from a thermally or chemically induced change in volume do not play a role. No damage to the active materials caused by breakage can take place.

Since liquids, serving as active materials, and gases are used, these are always in good contact with the ion-conducting membrane (such as by way of hydrostatic pressure of the liquid, or externally predefined pressure of the gas).

Advantageously, pumps for corrosive media, such as in a conventional redox flow battery, for example, can be dispensed with.

Unlike in lithium-ion batteries, for example, the active materials can essentially be used at 100%.

In the event of a fault, such as during an electrolyte membrane breakage, the reaction can be stopped in a relatively simple process by shutting off the gas.

The only restrictions that may possibly have to be considered in the energy storage device according to the invention are those of setting the required operating temperature, unless the active material is already present in the liquid state at room temperature, and optionally of taking into consideration the variable orientation of the energy storage device during operation.

The invention will be described in more detail hereafter based on exemplary embodiments and further considerations, without thereby limiting the invention. Moreover, several figures are used to provide a better understanding. In the drawings:

Figure 1:
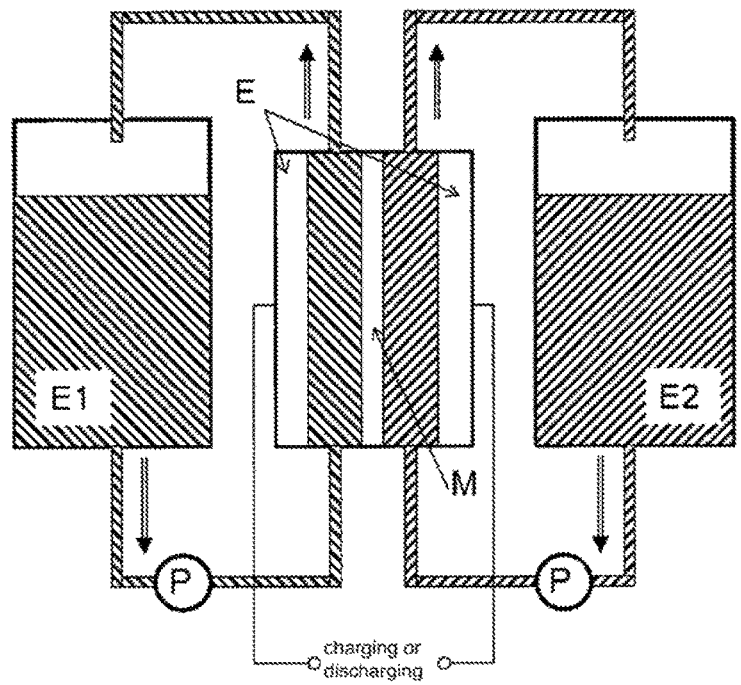
FIG. 1 shows a redox flow battery (state of the art), where E1, E2=liquid electrolyte, E=electrodes, M=ion-conducting membrane, P=pumps.
Figure 2:
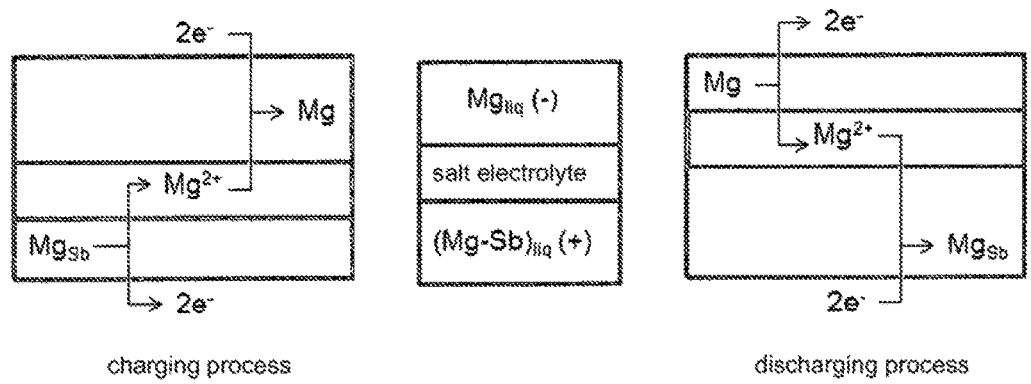
FIG. 2 shows a magnesium-antimony-liquid metal accumulator (state of the art)
Figure 3A:
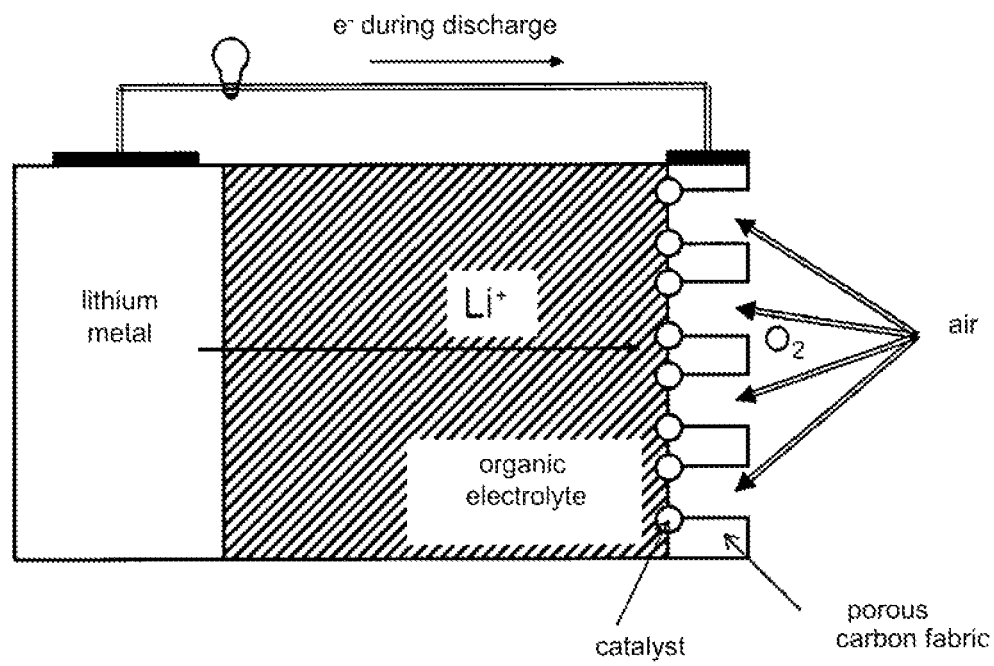
FIGS. 3a to 3d show embodiments of a metal-air battery (state of the art)
Figure 3B:
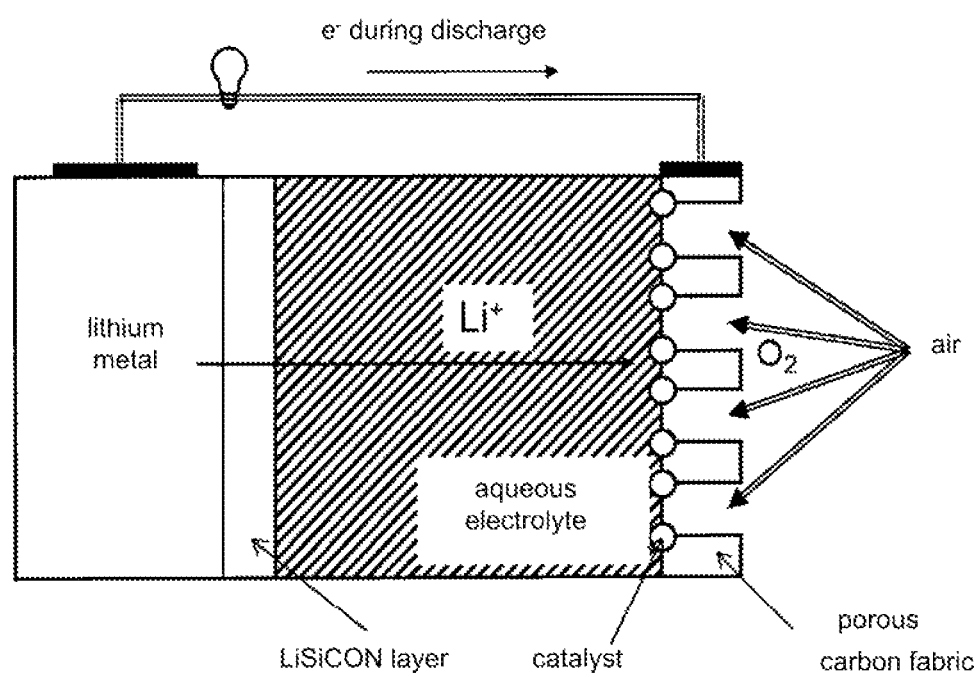
Figure 3C:
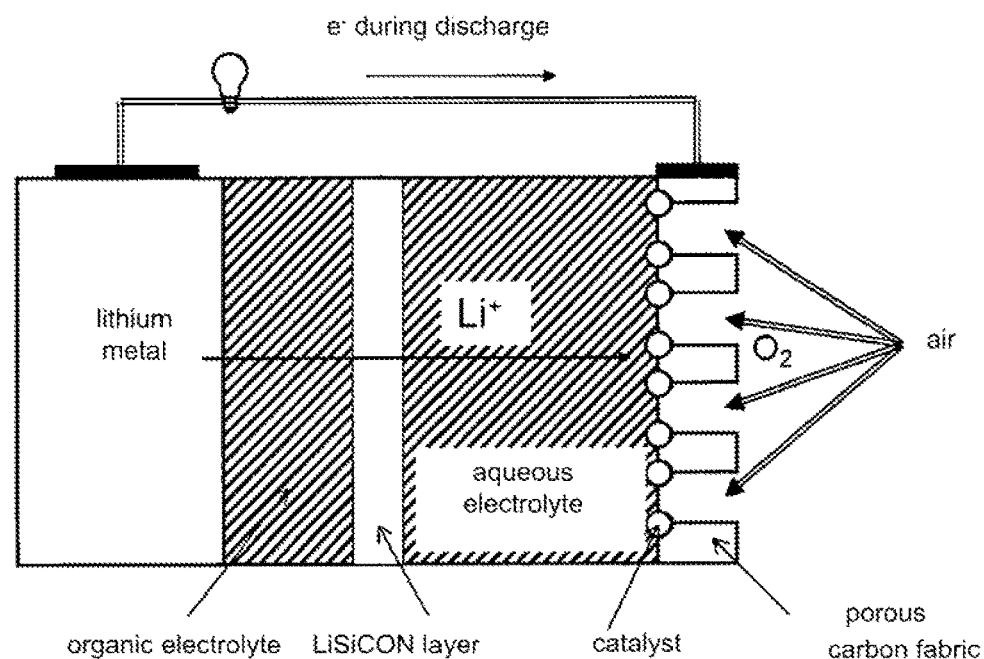
Figure 3D:
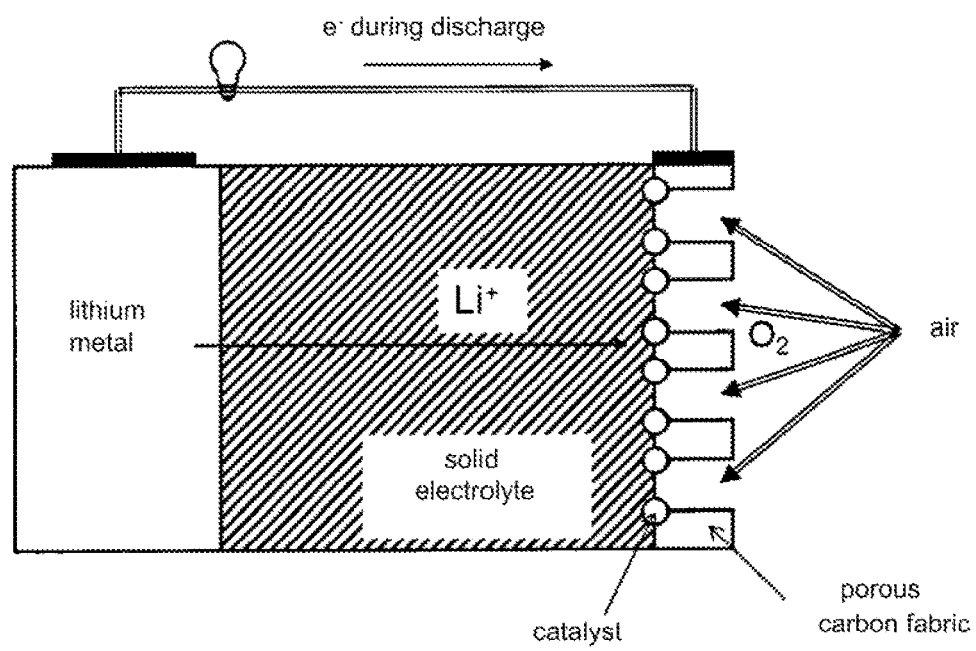
Figure 4:
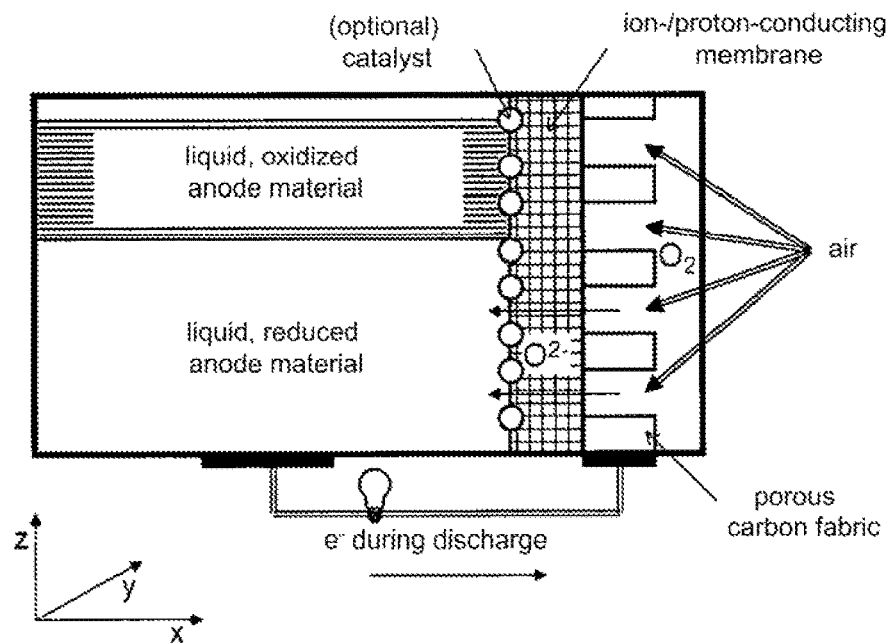

3a comprising a non-aqueous electrolyte;
3b comprising an aqueous electrolyte;
3c comprising a hybrid electrolyte;
3d comprising a solid electrolyte;

FIG. 4 shows a schematic of the liquid-medium/gas battery according to the invention comprising oxygen as the oxidizing agent. The coordinates in the shown Cartesian coordinate system shall describe the position in space here and hereafter: x and y are located parallel to the surface of the earth, and z is located perpendicularly to the surface of the earth. It is assumed that the electrolyte membrane is located in the y-z plane.

Figure 6:
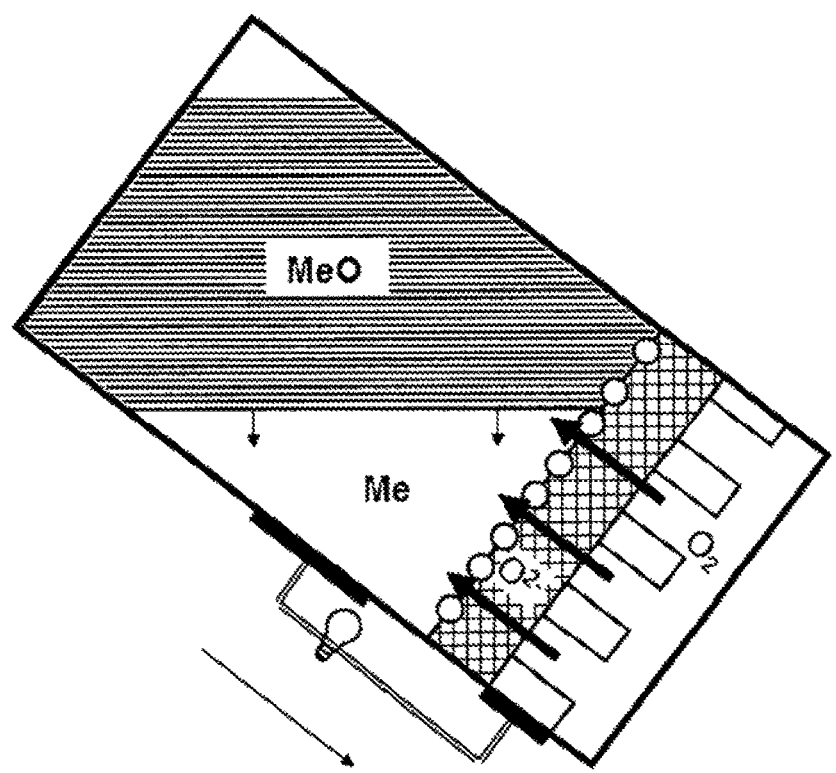
Figure 5A:
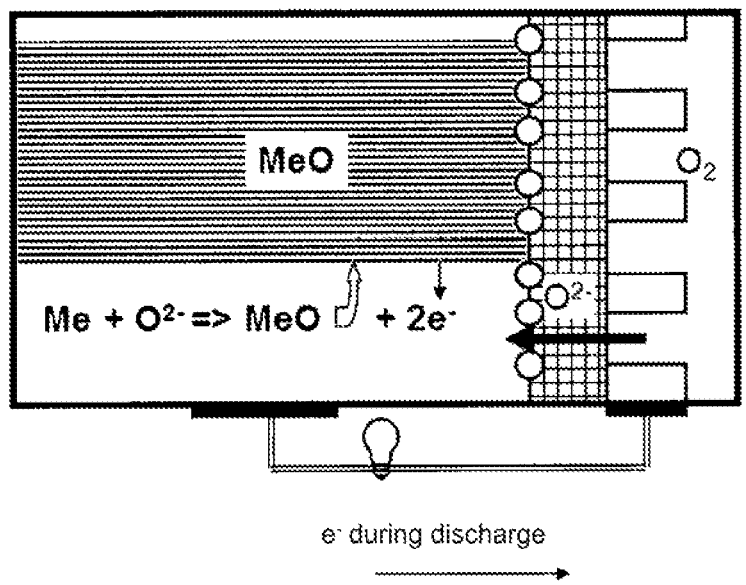
Figure 5B:
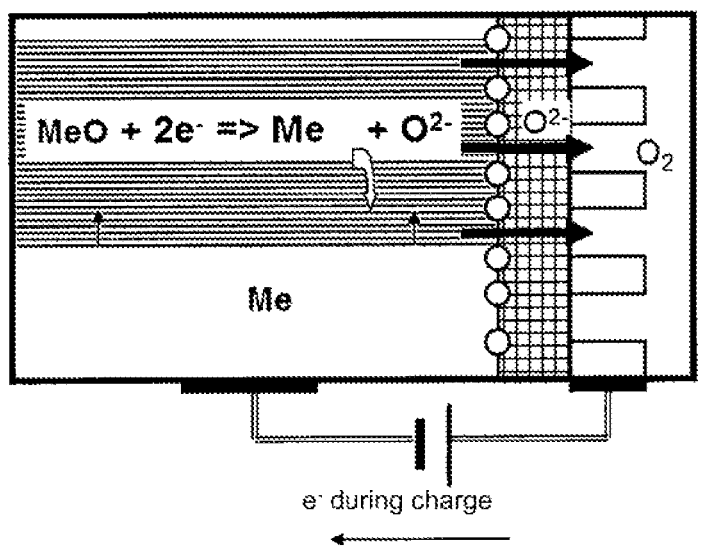
Figure 7:
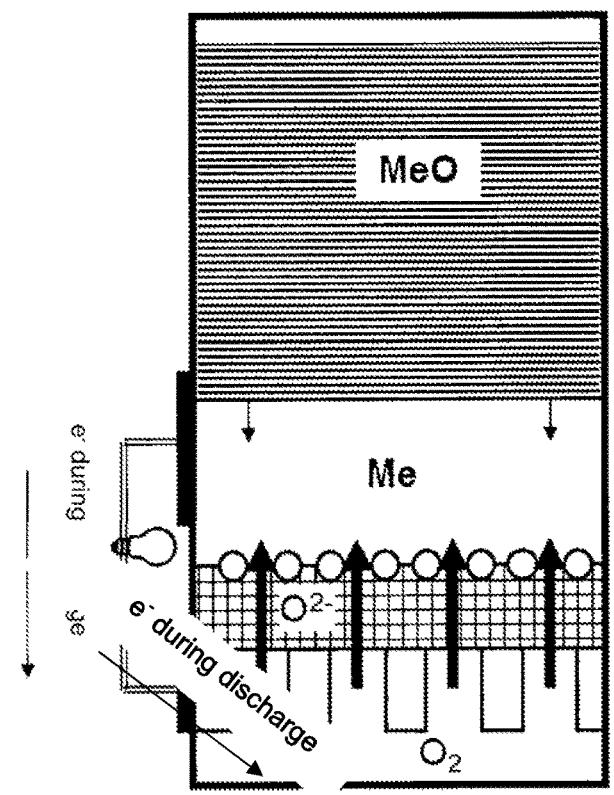
Figure 8:
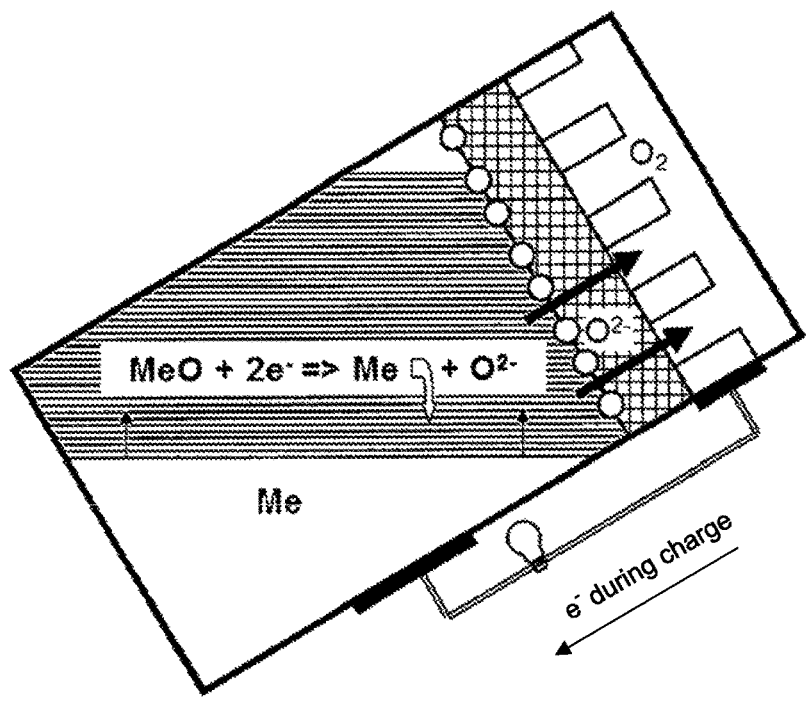

FIGS. 5a and 5b show embodiments of the liquid-medium/gas battery according to the invention comprising Me/MeO as the active material and oxygen as the oxidizing agent during the charging process and the discharging process; and FIGS. 6 to 8 show embodiments of the liquid-medium/gas battery according to the invention comprising oxygen as the oxidizing agent in different advantageous spatial positions.

First Exemplary Embodiment: Production Of A Model Liquid-Medium-Oxygen Battery

A gas-tight electrolyte layer, several micrometers thick made of the solid ion conductor yttrium-stabilized zirconia (abbreviated as, YSZ) is applied to a substrate made of $La_{0.65}Sr_{0.3}MnO_{3-\delta}$. Optionally, a further layer, which is made of a mixture of $La_{0.65}Sr_{0.3}MnO_{3-\delta}$ and electrolyte material, could be applied to the substrate prior to applying the electrolyte layer; this would advantageously increase the number of catalytically acting reaction centers. The substrate can be produced by way of tape casting and sintering, or pressing and sintering. The YSZ is applied by way of screen printing and sintering and/or physical vapor deposition, for example.

YSZ is a material known from fuel cell research as an oxygen ion conductor, in particular at temperatures around 800° C. The impermeability to gas of the electrolyte layer determines the self-discharge rate, and the layer should therefore be designed as gas-tight as possible.

In a ceramic cup made of zirconia produced by way of extrusion, having an inner volume of 0.5 liters here, this substrate is joined to the YSZ layer by way of pressing and/or glass solder joining, wherein the YSZ layer is directed at the opening of the cup.

Data for bismuth as the active material:

| | | |
|---|---|---|
| Bismuth (Bi) | melting point 270° C. | density 9.8 g/cm$^{-3}$ |
| Bismuth oxide (Bi$_2$O$_3$) | melting point 817° C. | density 8.9 g/cm$^{-3}$ |

Beforehand, the cup is filled approximately 80 vol % with bismuth (formula: Bi). The fill level normally remains below 100% because the active material increases in volume during oxidation. Advantageously, the joining is carried out in a glove box under a protective gas atmosphere or under vacuum so as to decrease, or entirely prevent, the penetration of foreign gases into the joined cup. The cup has a borehole on the side for connecting a small pipe, which is later routed out of the furnace and, likewise filled with Bi, serves as the current tap. During later operation, the cup is located so that the small pipe is routed downward to the outside. The small pipe is designed to be long enough that it comprises a region in which the small pipe (and thus also the Bi therein) has a temperature that is considerably below the melting point of Bi, even during operation of the battery. In this way, there is always subsequent contact with the liquid metal, which has a higher density than bismuth oxide.

A second, platinum wire is attached to the substrate of the membrane by sintering this together with the $La_{0.65}Sr_{0.3}MnO_{3-\delta}$ or by way of a conductive silver paint adhesive. The entire composition is heated in a furnace, in an air atmosphere for this model cell, to a temperature of approximately 850° C. The battery is located so that the YSZ-electrolyte membrane is located on a lateral surface, perpendicular to the bottom. Bismuth (Bi) has a higher density than bismuth oxide ($Bi_2O_3$), so that the metal collects in the vicinity of the lowest region of the receptacle and there is always good contact with the current tap. The battery can now be discharged via an external circuit (including an electric consumer) until a large portion of the liquid metal has oxidized.

Bismuth oxide ($Bi_2O_3$) has a melting point of approximately 817° C. and is likewise present in the liquid state under the set conditions. It has a slightly lower density and will therefore tend to float. In this way, it is possible to prevent a layer made of bismuth oxide that firmly adheres to the membrane from growing on the membrane.

Mode of Operation During Charging

So as to charge the liquid-medium/gas battery according to the invention, a voltage is applied to the current taps, the liquid metal transfers the voltage or the current to the liquid metal oxide, and oxygen ions move in the direction of, and through, the electrolyte to the gas electrode, where they are reacted at the $La_{0.65}Sr_{0.3}MnO_{3-\delta}$ layer to produce gaseous oxygen, which diffuses from the layer into the gas compartment. It was already demonstrated in high-temperature electrolysis experiments that $La_{0.65}Sr_{0.3}MnO_{3-\delta}$ is able to do so.

Theoretical Considerations Regarding the Energy Content, the Energy Density and Power Density:

Approximately 400 milliliters of bismuth metal is present in the cup. At a density of 9.8 g/cm³, this corresponds to a mass of approximately 3.9 kilograms or, at a molecular mass of 209 g/mol, this corresponds, in total, to approximately 19 moles. Each bismuth atom or ion carries three elementary charges, which means that approximately 3*19 moles of elementary charges can be stored, which is to say approximately 56*96400 coulombs, which is to say roughly 5.4 million coulombs, which corresponds to approximately 1500 ampere hours (unit: Ah) of charge. The energy density based on the volume is thus approximately 1500 Ah/0.7 liters, which is to say approximately 2100 Ah/liter (not taking the volume of the furnace into consideration), and the energy density based on the mass is 1500 Ah/5150 g, which is to say approximately 290 Ah/kg (approximately 1.2 kilograms cup, 100 grams membrane, 3.9 kilograms bismuth). However, the voltage is considerably lower in this example than in a lithium-ion battery; namely, it is only approximately 0.3 to 1 volt. This is an energy density of approximately 700 to 2100 Wh/liter, or approximately 100 to 290 Wh/kg. Nonetheless, the energy densities are thus at least as good as with current lithium-ion batteries. The membrane is based on those used in high-temperature fuel cells. Here, current densities of approximately 0.5 A/cm² of active cell surface are achieved with cathodes made of $La_{0.65}Sr_{0.3}MnO_{3-\delta}$.

When applying this to the cell introduced here and assuming that the polarization losses at the YSZ-Bi interface are negligible, in this example maximum currents of approximately 25 amperes at approximately one volt, this being 25 W, are obtained for an active surface of 50 cm².

Considerations Regarding Gas Impermeability

The self-discharge of commercial accumulators is in the order of magnitude of 1 to 10% per month. Using the above example, in this way a maximum permissible discharge amount per second can be determined for this battery. When oxygen is used as the oxidizing agent, the discharge amount can be converted into a gas amount of oxygen based on the data that, under normal conditions, oxygen gas has a volume of 22.4 liters and four electrons are needed to reduce one oxygen molecule. For self-discharge of 1% per month, the vessel as a whole must have a leakage rate of no more than $1*10^{-3}$ mbar*l/s for oxygen. If an inert protective gas flows around a portion of the receptacle (and this portion thus does not contain any oxygen), this does not have to be taken into consideration in the maximum permissible overall leakage rate for oxygen.

Second Exemplary Embodiment

Molten Glass-Based Liquid-Medium/Gas Battery

In contrast with the first exemplary embodiment, Bi is replaced with soda-potash-lime glasses. These have softening points around approximately 500° C. above this temperature, the viscosity thereof generally decreases further to a significant degree. Melts (liquid melts) are in general electrically conducting due to the mobility of the ions contained therein. The associated alkali metals all have melting points considerably below 500° C.

3rd Exemplary Embodiment

Boron oxide ($B_2O_3$) as an addition in the liquid active material normally causes the melting point of this oxide to be lowered, for example in a simple oxide of a metal: the active material Li—$Li_2O$ may be cited as a specific example. The melting point of the mixture is in the range of approximately 800 to 950° C. [2], and the potential of Li-oxygen reactions is just under 3 volts. Another example of an active material is Na—$Na_2O$. The melting point of the mixture is in the range of approximately 800 to 970° C. at a $B_2O_3$ content of approximately 55 to 90 mol %, based on the reactants $Na_2O$ and $B_2O_3$ [3]. Another example of an active material is Mn-MnO. The melting point of the mixture is in the range of approximately 800 to 970° C. at a $B_2O_3$ content of approximately 40 to 80 mol % [4]. The basic composition is the same as in the first exemplary embodiment.

The example of Bi—$Bi_2O_3$ provides another indication of the advantageous selection of the materials. $Bi_2O_3$, as a solid, also has an intrinsic conductivity for oxygen ions. This can be advantageous, for example, for states of the battery in which the actual operating temperature is not reached, for example as a charge/discharge reserve at temperatures lower than the actual operating temperature. This may also be advantageously used for other variants of the battery type introduced here; for example, in the variant using fluorine as the gas, a solid electrolyte for transporting fluorine ions that is made of a solid material and has a crystal structure similar to tysonite can be used, and a fluoride having a low melting point, likewise having a tysonite-like structure, can be used as the active material.

The following, not reversibly operating battery can be considered a special case. Li—$Li_2O$ comprising no additions that lower the melting point. This could be operated at considerably lower temperatures (as, in principle, can all battery types comprising alkali metals or alkaline earth metals as the liquid medium, having melting points between approximately 65 and 840° C.). The capacity would be increased, since no additions would be present in the receptacle for the liquid medium; however, this would come at the expense of discharge characteristics, and the oxide would have to be reduced to the metal again in another manner.

Operating temperatures around approximately 600° C. and higher are advantageous for high electrical power, since ceramic ion conductors or proton conductors generally exhibit a thermally activated behavior, following the Arrhenius law. Below approximately 600° C., the electrolyte conductivity may be insufficient, even with thin layers.

Considerations Regarding the Necessary Viscosities of the Liquid Media:

The reaction products should advantageously be transported away as quickly as possible from the ion-conducting membrane, so that no accumulation of reaction material occurs at the membrane. Since the differing densities of the two phases of the active material in the liquid receptacle provide the driving force for transport, in the present case of the liquid-medium/gas battery, a mathematical connection exists between the difference in densities and the necessary viscosity.

A model membrane having a surface area of one square centimeter is being analyzed. 1 ampere (1 A) of current should flow. It is further assumed that the liquid starting medium and the reaction product have differing surface tensions, are not miscible with each other, and also do not alloy or the like. In the model, the reaction product then detaches from the membrane surface in the form of a small spherical drop. Taking Archimedes' principle into consideration, the driving force is $F_A = \Delta\rho * V * g$, wherein $F_A$ is the driving force, $\Delta\rho$ is the difference in the densities of the liquid starting medium and reaction medium, V is the volume of the drop, and g is the acceleration due to gravity (9.81 m/s$^2$). The frictional force in the media is described by way of Stokes' friction here: $F_R = 6 * \pi * r * \eta * v$, wherein $F_R$ is the Stokes' frictional force, r is the radius of the liquid drop, $\eta$ is the viscosity of the medium in which the drop is moving, and v is the relative speed thereof in the medium. When the forces are equalized, the relationship between the viscosity and the difference in density is: $\eta = (2 * \Delta\rho * r^2 * g)/(9 * v)$. The speed v serves as a parameter that is used to estimate how far the drop has moved, or must move, from the site of creation to ensure the continued function of the battery. As a worst-case scenario, it is now assumed that the drop forms within one second, at a membrane having the dimensions of 1 cm*1 cm, at a current flow of 1 A, and that the drop completely leaves the space of the membrane region within one second, which is to say moves 1 cm (v=1 cm/s).

Using bismuth as an example of the active material, the density of Bi is 9.8 g/cm$^3$, and that of Bi$_2$O$_3$ is 8.9 g/cm$^3$. 1 A corresponds to a charge flow of 1 coulomb in one second. ⅓ mole Bi -> ⅓ mole Bi$^{3+}$ + 1 mole e$^-$. 1 mole of electrons corresponds to the Faraday constant F=96400 coulombs. At a charge of one coulomb in one second, accordingly the following amount of reaction product is generated per second: (⅓ mole Bi)/96400 -> (⅓ mole Bi$^{3+}$)/96400 + 1 coulomb electrons. (⅓ mole Bi$^{3+}$)/96400 reacts with the oxygen to form (⅙ mole Bi$_2$O$_3$)/96400, corresponding to 0.8 mg Bi$_2$O$_3$, or 9*10$^{-5}$ cm$^3$ Bi$_2$O$_3$. This volume corresponds to a sphere having a radius of 0.03 cm. Inserting this in the above equation for the viscosity, in this estimation 18 mPa*s is obtained as the minimum viscosity. At this viscosity, or a lower viscosity, the drop can move upward away from the membrane by at least 1 cm.

In general, the greater the difference in densities between the oxidized phase and the reduced phase of the active material and the lower the viscosities of the two phases, the easier and quicker the conversion can take place. The minimum difference in densities between the two phases of the active material should thus be at least 0.5 g/cm$^3$ at operating temperatures. Furthermore, the viscosity for the two phases at operating temperatures should not exceed 400 mPa/s, at a radius of the drops of the reaction product of 30 micrometers.

Cited in the present application:
[1] Ch. Mortimer, Chemie, Thieme Verlag Stuttgart, 3rd Edition 1980, ISBN3-13-484303-X, page 289.
[2] Phase Diagrams for Ceramicists, by E. M. Levin, H. F. McMurdie, F. P. Hall, The American Ceramic Society, Columbus, Ohio, USA, 1956, page 38, FIG. 12.
[3] Phase Diagrams for Ceramicists, by E. M. Levin, H. F. McMurdie, F. P. Hall, The American Ceramic Society, Columbus, Ohio, USA, 1956, page 39, FIG. 16.
[4] Phase Diagrams for Ceramicists, by E. M. Levin, H. F. McMurdie, F. P. Hall, The American Ceramic Society, Columbus, Ohio, USA, 1956, page 57, FIG. 91.
[5] Lee et al. "Metal-Air Batteries with High Energy Density: Li-Air versus Zn-Air", Advanced Energy Materials 2011, 1, pages 34-50

The invention claimed is:

1. An electrochemical energy storage device, comprising a gas electrode, an ion-conducting electrolyte and a counter electrode comprising an active material, which at operating temperatures between 500 and 1000° C. is present in the liquid state both in at least one reduced form and in at least one oxidized form,
wherein
the electrochemical energy storage device comprises a receptacle that includes the active material,
the electrolyte is a membrane having a thickness no greater than 10 μm and arranged entirely perpendicularly to the surface of the earth,
a solid catalyst layer is provided on the membrane at a side of the membrane facing the liquid active material,
the liquid active material within the receptacle is present in the form of horizontal layers, and
the counter electrode is formed of the liquid active material and the catalyst layer.

2. The energy storage device according to claim 1, wherein the active material is selected from the group consisting of metals, metalloids, simple or complex oxides, nitrogen compounds, carbon compounds, hydrides, phosphorus compounds, halogen compounds, chalcogen compounds, silicon compounds, germanium compounds or boron compounds, and mixtures of at least two members of this group.

3. The energy storage device according to claim 1, comprising bismuth as the active material.

4. The energy storage device according to claim 1, wherein
the gas electrode is disposed perpendicularly to the surface of the earth, and
the horizontal layers of the active material a liquid oxidized phase and a reduced phase, respectively, of the active material, so that
the ion-conducting electrolyte completely is in contact both with a liquid oxidized phase and with a liquid reduced phase of the active material during a charging or discharging process.

5. A battery stack, comprising at least two of the electrochemical energy storage device according to claim 1.

6. A method for operating an electrochemical energy storage device, the electrochemical energy storage device comprising a gas electrode, an ion-conducting electrolyte and a counter electrode comprising an active material,
which at operating temperatures between 500 and 1000° C. is present in the liquid state both in at least one reduced form and in at least one oxidized form, wherein
the electrochemical energy storage device comprises a receptacle that includes the active material, the liquid active material within the receptacle is present in the form of horizontal layers, and the counter electrode is formed exclusively of the liquid active material, or of the liquid active material and a solid catalyst layer disposed on a side of the non-conducting electrolyte facing the liquid active material, the method comprising:

heating the energy storage device to operating temperatures between 500 and 1000° C.; and disposing the ion-conducting electrolyte substantially perpendicularly to the surface of the earth; wherein layering of the two phases along the ion-conducting electrolyte takes place as a result of a difference in density between a phase made of liquid oxidized active material and a liquid active material present in reduced form;

reduction or oxidation of the active material takes place exclusively at the ion-conducting electrolyte or at the solid catalyst layer disposed on the ion-conducting electrolyte, and varying a contact surface between the ion-conducting electrolyte, or a solid catalyst layer disposed on the ion-conducting electrolyte, and at least one liquid phase of the active material by changing the position of the energy storage device.

7. The method according to claim 6, wherein oxygen is used as an oxidizing agent.

8. The method according to claim 6, wherein an anion-conducting membrane is used as the electrolyte.

9. The method according to claim 6, wherein a cation-conducting or proton-conducting membrane is used as the electrolyte.

10. The method according to claim 6, wherein the active material is selected from the group consisting of metals, metalloids, simple or complex oxides, nitrogen compounds, carbon compounds, hydrides, phosphorus compounds, halogen compounds, chalcogen compounds, silicon compounds, germanium compounds or boron compounds, and mixtures of at least two of the members of this group.

11. The method according to claim 6, wherein bismuth is used as the active material.

12. The method according to claim 6, wherein a chemical reaction at the counter electrode comprising the liquid active material is supported by an additional catalyst layer applied to the electrolyte.

13. The method according to claim 6, wherein the operating temperature for the electrochemical energy storage device is set by way of an external heat source.

14. A method for operating an electroChemical energy storage device, the electrochemical energy storage device comprising a gas electrode, an ion-conducting electrolyte and a counter electrode comprising an active material, which at operating temperatures between 500 and 1000° C. is present in the liquid state both in at least one reduced form and in at least one oxidized form, wherein the electrochemical energy storage device comprises a receptacle that includes the active material, the liquid active material within the receptacle is present in the form of horizontal layers, and the counter electrode is formed exclusively of the liquid active material, or of the liquid active material and a solid catalyst layer disposed on a side of the non-conducting electrolyte facing the liquid active material, the method comprising:

heating the energy storage device to operating temperatures between 500 and 1000° C.; and disposing the ion-conducting electrolyte substantially perpendicularly to the surface of the earth; wherein layering of the two phases along the ion-conducting electrolyte takes place as a result of a difference in density between a phase made of liquid oxidized active material and a liquid active material present in reduced form; and reduction or oxidation of the active material takes place with hydrogen as a reducing agent and exclusively at the ion-conducting electrolyte or at the solid catalyst layer disposed on the ion-conducting electrolyte.

\* \* \* \* \*